United States Patent [19]
Rose

[11] Patent Number: 5,999,129
[45] Date of Patent: Dec. 7, 1999

[54] MULTIPLATFORM AMBIGUOUS PHASE CIRCLE AND TDOA PROTECTION EMITTER LOCATION

[75] Inventor: Conrad M. Rose, Dahlgren, Va.

[73] Assignee: Litton Systems, Inc., Woodland Hills, Calif.

[21] Appl. No.: 09/088,196

[22] Filed: Jun. 1, 1998

[51] Int. Cl.⁶ .................................. G01S 1/30; G01S 1/24
[52] U.S. Cl. .......................... 342/394; 342/387; 342/442
[58] Field of Search .................................... 342/394, 387, 342/442

[56] References Cited

U.S. PATENT DOCUMENTS

| | | | |
|---|---|---|---|
| 4,734,702 | 3/1988 | Kaplan | 342/424 |
| 4,797,679 | 1/1989 | Cusdin et al. | 342/387 |
| 5,343,212 | 8/1994 | Rose et al. | 342/424 |
| 5,526,001 | 6/1996 | Rose et al. | 342/442 |

*Primary Examiner*—Mark Hellner
*Attorney, Agent, or Firm*—Scott J. Coonan, Esq.

[57] ABSTRACT

A method and system for determining the geolocation—i.e., the latitude, longitude, and altitude—of a stationary RF signal emitter from two or more moving observer aircraft. The observers receive signals from the emitter and the system measures the phase difference between the signals. The observers then perform pulse time of arrival (TOA) measurements over a predetermined clock interval, and calculate the time difference of arrival (TDOA) of corresponding, same-pulse, emitter signals. Based on geometric relationships, the system creates a series of circular lines of position (LOPs) for each observer, and computes hyperbolic LOPs based on the TDOA calculations. The system determines emitter location from the intersection of the hyperbolic LOPs and the circular LOPs.

12 Claims, 8 Drawing Sheets

MULTIPLATFORM AMBIGUOUS PHASE CIRCLE AND TDOA PROTECTION EMITTER LOCATION

BACKGROUND OF THE INVENTION

1. Field of Invention

This invention uses multiple observers to passively determine range and bearing to an RF emitter. In particular, it employs ambiguous emitter wavefront phase change measured at each of at least two moving aircraft, and pulse time of arrival measurements made between two platforms to perform the geolocation.

2. Description of Related Art

Applicant's copending application entitled, "COMBINED PHASE-CIRCLE AND MULTIPLATFORM TDOA PRECISION EMITTER LOCATION," filed on even date herewith and assigned to present assignee, the entire disclosure of which is hereby incorporated by reference in this specification, discloses a method for reducing the geometrical dilution of precision (GDOP) degradation experienced when using multiplatform circular lines-of-position for precision emitter location. This was accomplished by combining the circles-of-position (COPs) generated by interferometer phase difference measurements made by one moving platform with hyperbolic lines-of-position (HLOPs) generated by pulse time difference of arrival (TDOA) measurements between two observers. This combined technique overcame low-frequency limitations in the phase-circle-only approach and reduced sensitivity to time of arrival (TOA) measurement errors compared with TDOA-only geolocation. The use of measurements made by a fully resolved short baseline interferometer (SBI) on the moving platform was a key element of the method. For example, the SBI angle-of-arrival (AOA) measurements made by two separate platforms were used to provide an initial coarse location of the emitter. This coarse location was accurate enough to verify that TDOA measurements between observers were being made on the same pulse of the emitter signal. The SBI was also used in more fundamental ways to generate the phase circles, or COPs, as discussed briefly below.

The COPs were produced from long-baseline interferometer differential phase measurements by the method described in the applicant's U.S. Pat. No. 5,526,001. Resolving ambiguous LBI phase requires simultaneously measuring fully resolved phase with the SBI, using the technique disclosed by Kaplan in U.S. Pat. No. 4,734,702.

In this approach for generating phase circles, requirements on the system phase measurement's repeatable accuracy were reduced. This reduction occurred because any fixed-phase bias error present during the receiver dwell at the first observation point canceled when forming the phase difference at the second observation point. Thus, the LBI baseline did not require calibration. Also, constant antenna phase mistrack errors and receiver calibration phase-bias errors canceled and had no impact on COP accuracy. But as a consequence of this method, the LBI measured only angle change, and not AOA. The SBI not only predicted angle change to resolve the LBI, but also provided the measure of AOA required to correct for variable bias errors.

Variable bias errors, i.e., those that remain constant during a receiver dwell but vary from one receiver dwell to another, greatly impact COP precision and, hence, location accuracy, and must be reduced. The most significant variable bias error is due to changes in a scanning radar's electromagnetic wave polarization caused by the observer detecting different emitter sidelobes in different receiver dwells. This dwell-to-dwell polarization change affects the LBI antenna phase mistrack, and can cause in the differential phase measurement an error of five electrical degrees or more. Since the error is constant between all signal pulses used to form the phase difference between dwells, it cannot be reduced by averaging, as can thermal noise and quantization errors. The method to reduce this error disclosed in applicant's copending application, entitled, "COMBINED PHASE-CIRCLE AND MULTIPLATFORM TDOA PRECISION EMITTER LOCATION," contemplates producing a table from antenna polarization response measurements on the observing aircraft for different signal angles-of-arrival. The SBI AOA measurements made when LBI phase differences are formed are then used to access this table for calibration data that corrects the LBI measurements.

Hence, for resolving the long-baseline interferometer, correcting the variable phase bias errors, and confirming the TDOA measurement, the SBI forms an intrinsic part of the approach given in applicant's copending application entitled, "COMBINED PHASE-CIRCLE AND MULTIPLATFORM TDOA PRECISION EMITTER LOCATION." However, many aircraft used to passively locate emitters do not currently have an SBI available. Furthermore, because of weight, cost, and airframe limitations, it may not be feasible to add an SBI to the existing electronic surveillance measurement (ESM) system. Therefore, it is desirable to have an alternative approach to implementing a combined COP-HLOP location technique that preserves the method's GDOP reduction, improved low-frequency performance, and reduced need for TDOA accuracy, while requiring only two antenna elements. This requires that alternatives be found to resolve the phase ambiguity and correct the phase polarization error.

One alternative approach to differentially resolving the LBI is disclosed in applicant's U.S. Pat. No. 5,343,212, and discussed in connection with phase-circle generation in U.S. Pat. No. 5,526,001. A set of emitter positions is postulated, and each used to establish a hypothesis test. The hypothesis test generates a set of potential emitter locations, resolves the LBI in a manner consistent with each of these assumed locations, and utilizes a sequential check over a number of measurements to determine the actual emitter location from the set. While robust, this method requires multiple receiver dwells to eliminate the incorrect emitter locations. In many multiplatform geolocation situations that are tactically important, the emitter may transmit for no more than ten seconds and the number of phase difference measurements made in that interval can be severely limited. Such a small number of measurements may not be sufficient for the hypothesis test to generate a single unambiguous phase circle.

This invention overcomes the limitations of using an SBI or hypothesis test to resolve the LBI at the expense of requiring at least two moving observers to separately generate multiple phase circles from the ambiguous LBI differential phase measurements. A phase circle is produced for each possible ambiguity resolution of the differential measurements. This is illustrated in FIG. 3 for the scenario shown in FIG. 2 208. The COPs 300, 301 and 302 are derived from the ambiguous phase measurements made by observer 308, corresponding to aircraft 206 in FIG. 2 208, while COP 304, 305 and 306 are generated from the ambiguous phase measurements made by aircraft 307 (205 in FIG. 2). COP 301 and 305 are the true emitter circles-of-position, and this is determined by the common intersection 309 with the TDOA hyperbola limb 303. In this example the TDOA is measured between platforms 307 and 308, but other observers could be used. Thus the invention does not attempt to correctly resolve the phase difference measurement ambiguities before generating the phase circles, and hence does not have the problem with sparse data that can degrade the hypothesis test method. In fact, the phase difference ambiguity is not resolved before the emitter is located. This creates difficulties in correcting the LBI phase measurements for variable bias error and overcoming this difficulty is a key aspect of the invention.

The use of the TDOA measurement in conjunction with the ambiguous phase measurements to locate the emitter and then the use of emitter location to resolve the differential phase should be compared with methods that use TDOA to directly resolve the LBI. Cusdin et al. in U.S. Pat. No. 4,797,679 provide an approach representative of such direct techniques. The LBI used in Cusdin's method must be phase calibrated, and the TDOA measurement is made on the same platform between the two antennas used to measure LBI phase. Also the TDOA measurement must be nearly simultaneous with the phase measurement. Cusdin's is thus intrinsically a single platform technique that associates resolved LBI phase with emitter signal AOA. For multiplatform geolocation the resolved AOAs on two platforms could be intersected, as shown in FIG. 1a. In this figure 160 and 161 represent the AOA, while 178 and 179 are the wedge shaped AOA errors, and 162 the uncertainty these errors create in the emitter location. This region of uncertainty grows quickly with range, but an advantage the method does have is that the observers 163 and 165 obtain the range estimate in a single observer dwell.

By contrast to the direct ambiguity resolution of calibrated LBI phase measurements by TDOA in a single receiver dwell, the method disclosed here uses uncalibrated LBI baselines that are differentially resolved across receiver dwells. Hence, as noted above, AOA is not measured and at least two separate receiver dwells made seconds apart, indicated by the moving observer at 165–166 and at 167–168, are required. Also the LBI ambiguities for the phase measurements made on at least two aircraft must be simultaneously resolved, in effect, by locating the emitter utilizing TOA measurements made on separate platforms rather than across the LBI baseline. The TOA measurement does not have to be time coincident with the LBI phase measurements, nor, as emphasized above, do the observers making the TOA measurements have to be the same as those making the differential phase measurements. Thus this invention is intrinsically a multiplatform technique.

The association of the LBI differential phase measurements with COP 169 and 170 in 174 FIG. 1a rather than the LBI phase with AOA 160 and 161 (173 FIG. 1a) provides a substantial reduction in GDOP compared with a multiplatform application of Cusdin's method. Although the magnitude of the COP error region does have a range dependence since it is ultimately based on the bearing subtended at the emitter, the excursions caused by one sigma error variations indicated by 175 and 177 are the same at each point on the respective COPs 169 and 170. Further, since the TDOA measurement is made between platforms rather than between two antenna on a single platform, it provides a third LOP 171 (with range independent one sigma error 175) which greatly reduces the GDOP, as indicated by the emitter location error region 172.

FIG. 1b is a top level block diagram of the invention, illustrating how ambiguous LBI and TDOA measurements are used to geolocate the emitter in the manner indicated by 174 FIG. 1a for the FIG. 2 208 scenario, producing the COP and HLOP as shown in FIG. 3. Aircraft 307 in that figure corresponds to observer 100 FIG. 1a. The system on aircraft 308 corresponds to 102 and is identical to 100. Hence only the utilization of system 100 will be described in detail in the following summary. The central computing site 103 could be located on either aircraft, or on both, or on a third platform.

The operation of these particular features and other aspects of the invention, such as the method for reducing the impact of variable bias errors without making SBI measurements, are presented in more detail in the summary that follows.

SUMMARY OF INVENTION

One object of the invention is to associate multiple circles with each set of differential phase measurements made by two uncalibrated and unresolved LBIs on two separate aircraft. Each circle is produced by a different permissible ambiguity resolution of the constant phase difference measurements. Two of these circles, e.g., 301 and 305 FIG. 3, in the absence of random measurement error, pass through the emitter's location.

Figure 3:
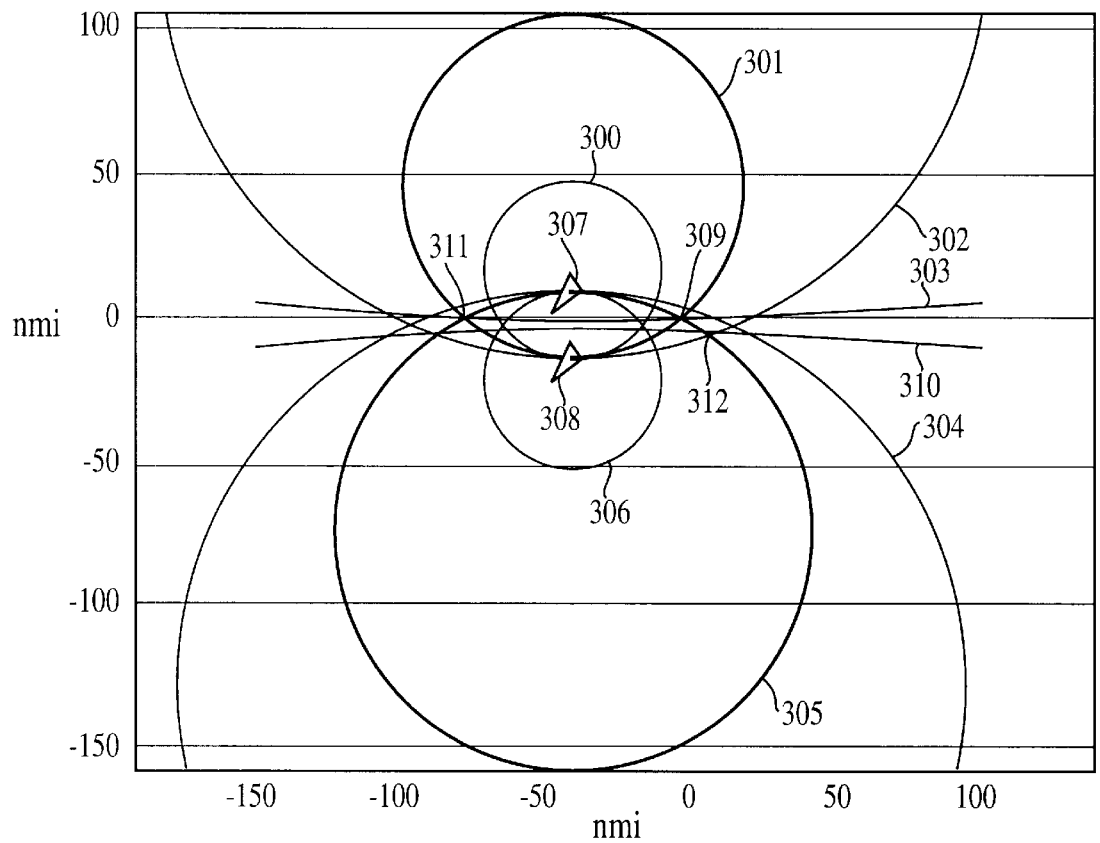
FIG. 3 illustrates the creation of multiple phase circles from the ambiguous LBI differential phase measurements, and the intersection of the phase-circles with TDOA hyperbola.

Another object of this invention is to use TDOA measured between these two aircraft, or other platforms, to form a single common intersection, i.e. 309 FIG. 3, with these two phase-circles at the emitter, and hence to locate the emitter.

Yet another object of the invention is to correctly resolve all the ambiguous LBI phase difference measurements collected at the two aircraft by predicting the ambiguity integer from this initial estimated emitter location.

Still another object of this invention is to calibrate these resolved phases to reduce the dwell-to-dwell variable bias error due to emitter polarization changes without requiring direct AOA measurements.

A further object of this invention is to use the initial emitter location to estimate elevation in order to cone correct the LBI differential phase measurements without requiring direct measurements of emitter elevation.

It is also an object of the invention to generate estimates of the initial and final bearings $a_1$ and $a_2$ required to obtain the true azimuth difference without measuring azimuth directly.

A final object of this invention is to use these true azimuth differences along with the TDOA measurements and derived elevation to refine the emitter geolocation estimate.

Figure 1A:
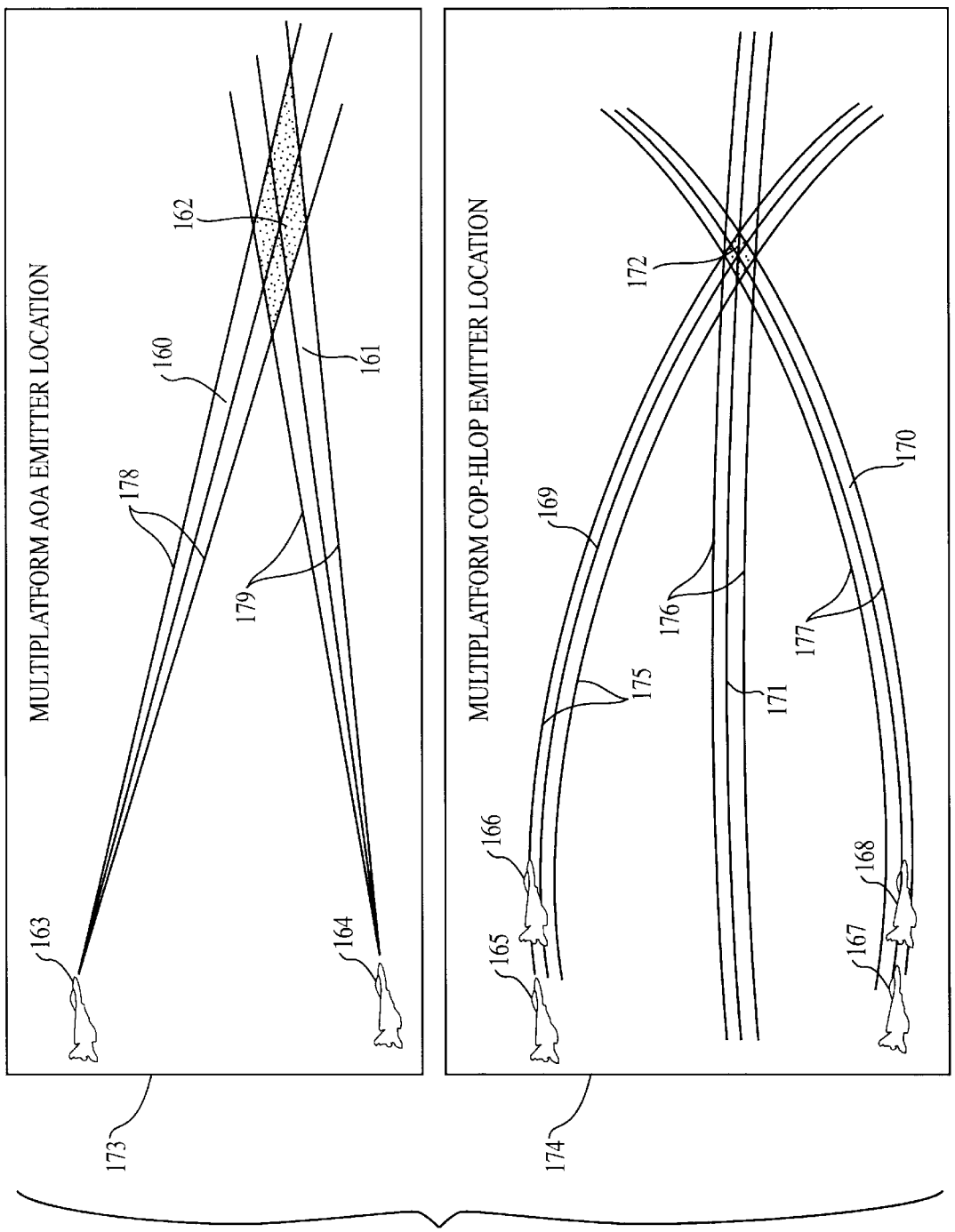
FIG. 1a contrasts multiplatform emitter location using TDOA to absolutely resolve the LBI and obtain AOA with the approach of the current invention utilizing phase-circles and TDOA.
Figure 1B:
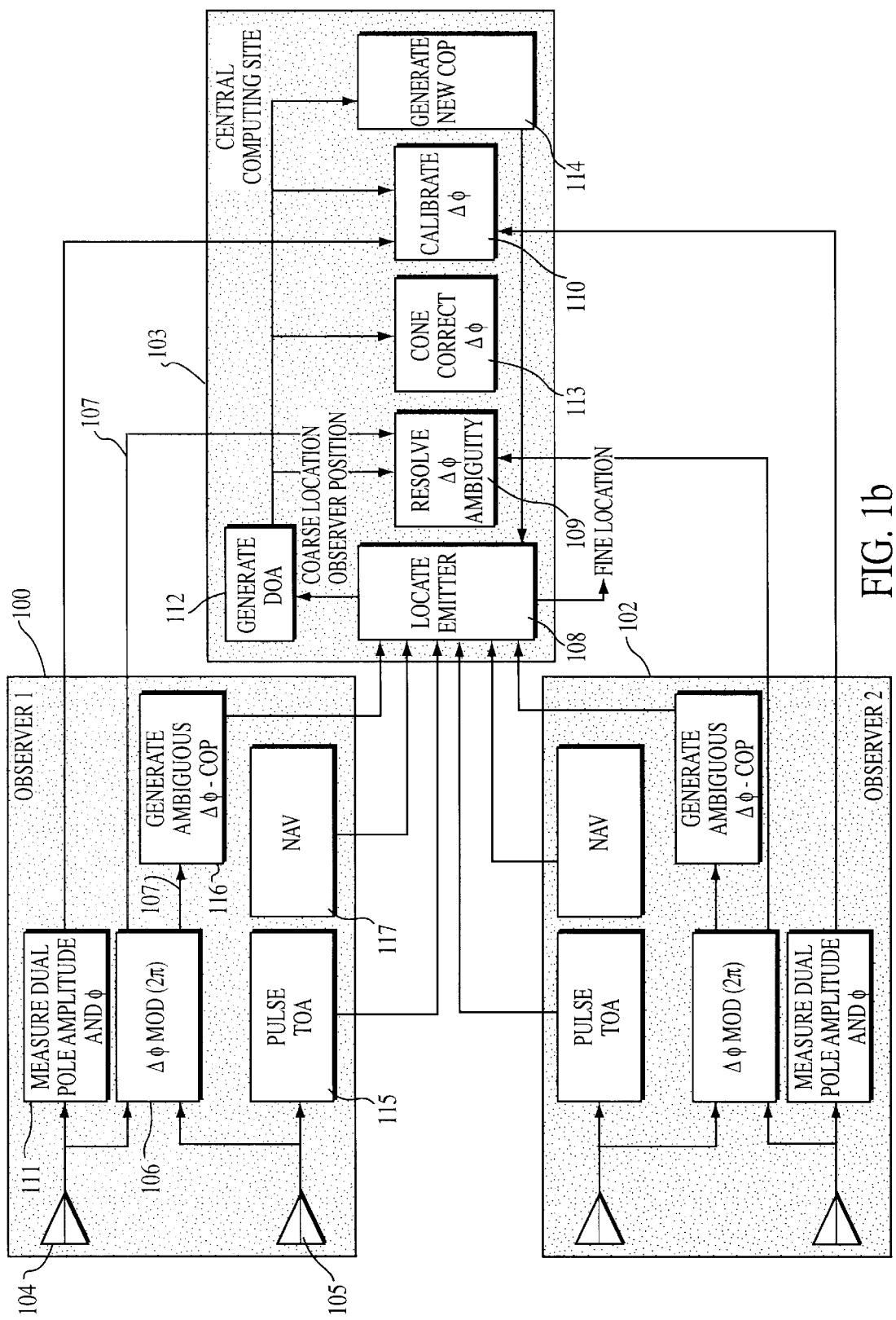
FIG. 1b is a schematic representation of the current invention. The method is intrinsically a multiplatform approach in which the ambiguous phase measurements made by one observer can only be resolved by both ambiguous phase measurements made by a second observer, and TDOA measurements between observers.

Referring to FIG. 1b, the LBI baseline is formed by antennas 104, 105 on observer 100. Process 106 indicates the ambiguous LBI phase measurement $f_m$, where $$\phi_m = \phi_{uncal} \mod(2\pi) = \frac{2\pi}{\lambda} \vec{d} \cdot \vec{u} - 2\pi n + b \quad (1)$$

with $\vec{d}$ = LBI baseline vector $\lambda$ = emitter RF signal wavelength $\vec{u}$ = signal DOA unit vector n = ambiguity interger b = phase bias is differenced between receiver dwells 1 and 2 to remove the phase bias error b, giving $$\Delta\phi = \frac{2\pi}{\lambda}\left[\vec{d}_2 \cdot \vec{u}_2 - \vec{d}_1 \cdot \vec{u}_1\right] - 2\pi(n_2 - n_1) \quad (2)$$

as the output 107.

The azimuth difference is found by correcting the phase difference as indicated in Equation 3. This equation is the phase-difference to bearing-change association for the simple case of the aircraft heading (with respect to a North-East-Down local coordinate system) making angles $q_1$ at dwell 1 and $q_2$ during dwell 2 with no roll or pitch out of the local level plane, i.e.

$$\Delta a = 2\arcsin\left[\frac{\frac{\lambda}{d}\left[\frac{\Delta\phi_m}{2\pi} + (n_2 - n_1)\right]}{2\sin\left(\frac{(\theta_1 + \theta_2) - (a_2 + a_1)}{2}\right)\cos(e)}\right] - (\theta_1 + \theta_2) \quad (3)$$

Here d is the LBI baseline length, while $a_1$, $a_2$ are the emitter azimuths in the local North-East-Down (NED) reference frame at the first and last dwell. The elevation e is assumed to not change significantly between dwells.

In this invention the ambiguity integer $n_2-n_1$ in Equation 3 is resolved or found in process 109 after the emitter is initially located. Hence, as noted above, the invention does not separately resolve the LBI differential phase ambiguities for a single platform alone, and then intersect the resulting unique circles associated with each observer to geolocate the emitter, as would be done if the method of applicant's U.S. Pat. No. 5,526,001 were used for multiplatform geolocation. The initial location does require a TDOA measurement between two platforms, but emitter azimuths $a_1$, $a_2$ and elevation e are not measured.

Figures 1, 4:
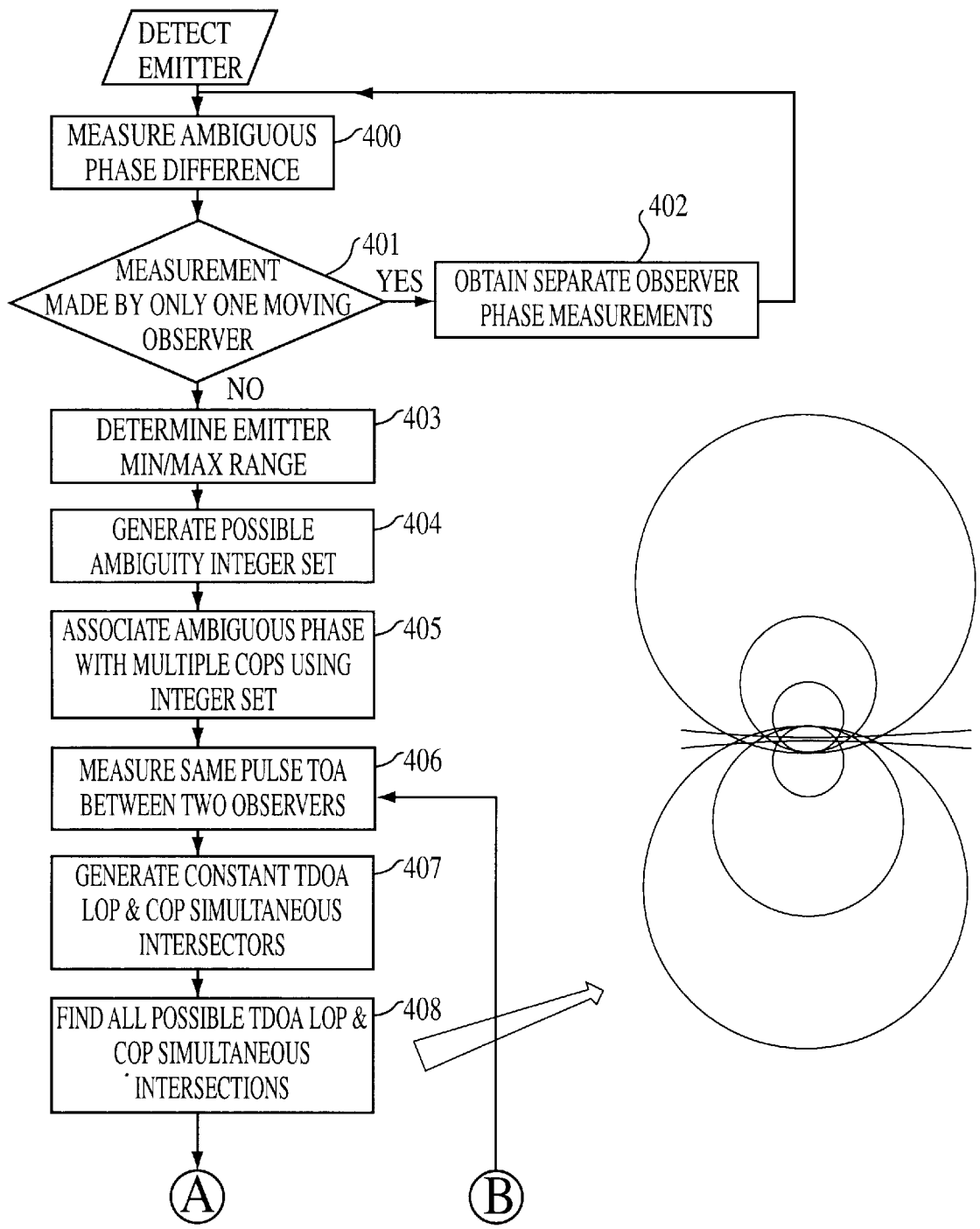
FIG. 4 is a flow diagram showing the various steps in applying the method of the current invention.
Figures 2, 4:
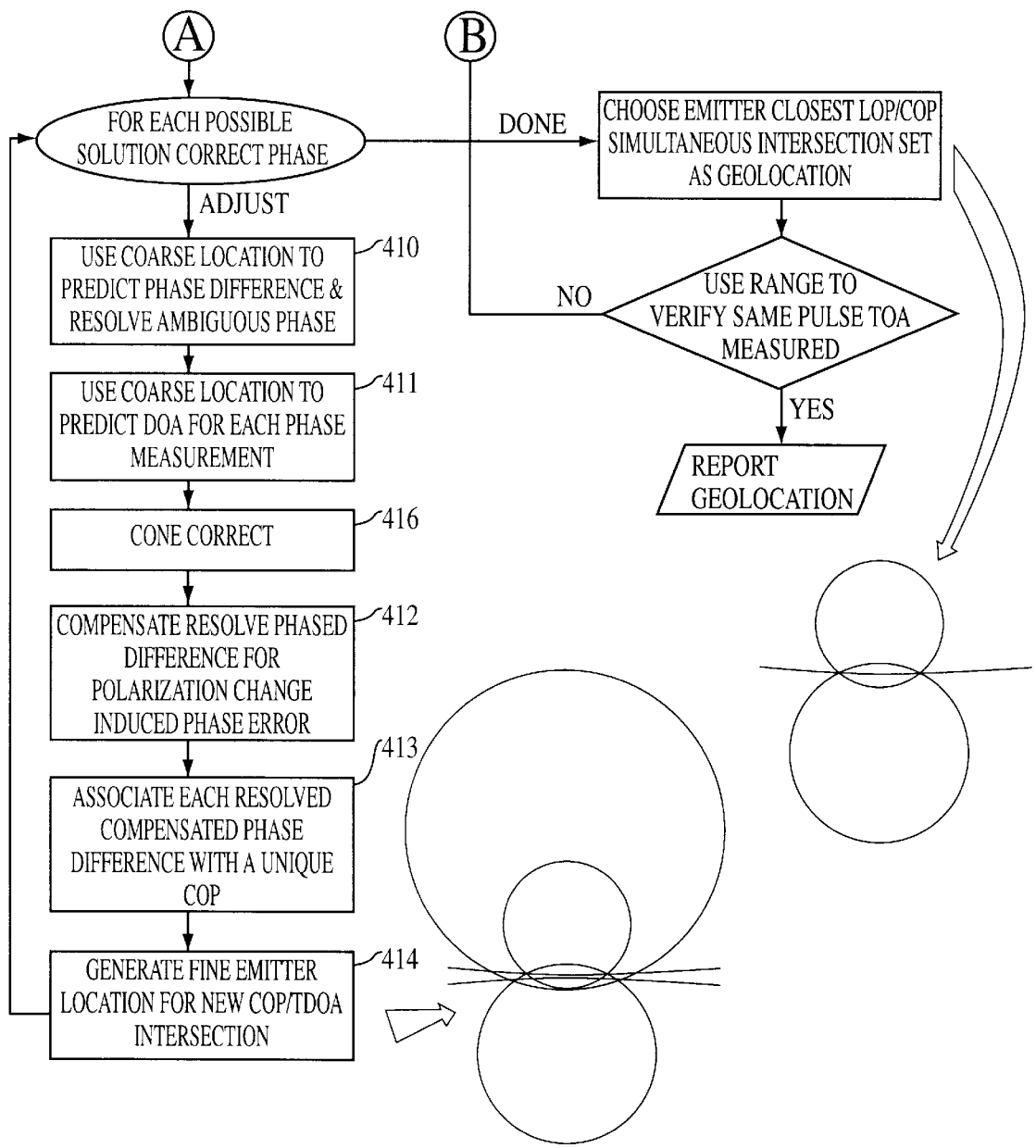

The method this invention uses to estimate these required quantities and also accomplish the other objectives is shown in FIG. 4. It is essential that ambiguous COP be generated by at least two separate observers, hence steps 400, 401 and 402 indicate the iterative (across observers) nature of the ambiguous differential phase measurement process. In order to associate the differential phase with a bearing change Da and hence with a COP it is necessary to determine the set of possible ambiguity integers $m=n_2-n_1$ in Equation 3 by 403 and 404, which occurs in 116 FIG. 1b. The minimum and maximum values for m are determined from knowledge of the radar horizon derived from the observer's altitude. Two assumptions are made. These two assumptions are the smallest angle off the aircraft nose the emitter can lie, and the closest range for the emitter. These two assumptions, and the radar horizon, bound the differential phase ambiguity set of possible integer m. In 405 a separate COP, e.g. 300–302 and 304–306 FIG. 3, is generated for the differential phase measurement resolved by each integer in the set. This is done by finding Da utilizing the general relationship of which Equation 3 is a special case. In doing this the emitter elevation e is assumed to be zero. This assumption is corrected later. To set up the ranging solution the same-pulse TOA must be measured 406 between two observers. This is performed in process 115 FIG. 1b. This measurement can be done at any time relative to the phase measurement. That is, absolutely no coordination is required between the two. The TOA measurements are sent, as are the ambiguous COPs, to the central computing site 103, and the TDOA HLOP, e.g. 303 and 310 FIG. 3, formed 407. This site could be each observer, in which case each observer would determine its own emitter geolocation solution, or the site could be a separate nonobserving aircraft or ground station. The COPs and HLOPS are then simultaneously solved 408 for the emitter location. If there were no system errors this solution would result in a single unique position (309 FIG. 3), except in possible cases where COP-HLOP symmetry gives multiple solutions, such as FIG. 3 311. These cases are easily resolved by emitter amplitude AOA measurements, which can be a byproduct of the amplitude and phase measurements made by 111 FIG. 1b to support emitter polarization estimation. Measurement errors can create further multiple solutions, for example 312 FIG. 3. This case is handled 410–414 by reducing the measurement errors in a way that utilizes the multiple candidate positions. The dominant errors are the coning error due to the assumption of zero elevation and emitter polarization induced phase error. Correcting both errors depends on measuring 112 FIG. 1b emitter signal direction of arrival (DOA). Since the LBI measures only AOA change, DOA must be found 410 from the initial emitter location generated 408 from the uncorrected phase, and the observer position when the phase measurement was made. Once DOA is obtained for each candidate emitter location, the resulting elevation estimate is used to cone correct Da, as indicated in Equation 3. The DOA are also used to predict the LBI phase change, and hence resolve the LBI. The resolved LBI phase is adjusted for phase errors induced by variable emitter polarization utilizing calibration data stored in a table, and accessed as a function of signal DOA. New COP are generated 413 using the separate sets of corrected phase data (one set for each possible emitter location). The new COP and HLOP are iteratively solved 414 in 108 FIG. 1b, i.e the solution is obtained by breaking up the differential phase measurement set up into smaller subsets, and choosing the solution producing the most sequentially uncorrelated or "whitest" estimate residual using an algorithm operating on the principals described by Kailath, "An Innovations Approach to Least Squares Estimation-Part 1: Linear Filtering in Additive White Noise," *IEEE Transactions on Automatic Control*, vol. AC-13, No. 6. The solution with the whitest residual in this problem is equivalent to the one that iteratively correctly resolves the LBI. This solution is chosen in 409 as the emitter location. A final check is done 415 to verify using the estimated emitter location that the same pulse was used to generate the HLOP. If not, new TOAs must be measured and the whole process repeated.

In performing these steps it is advantageous to have a similar system installed on multiple observers, i.e., 100 and 103 in FIG. 1b, each observer measuring both phase and TOA, as well as performing the intersection calculations and doing phase calibration. Such a single system realization of the preferred embodiment of the invention is described below.

DETAILED DESCRIPTION OF THE PREFERRED EMBODIMENTS

Figure 5:
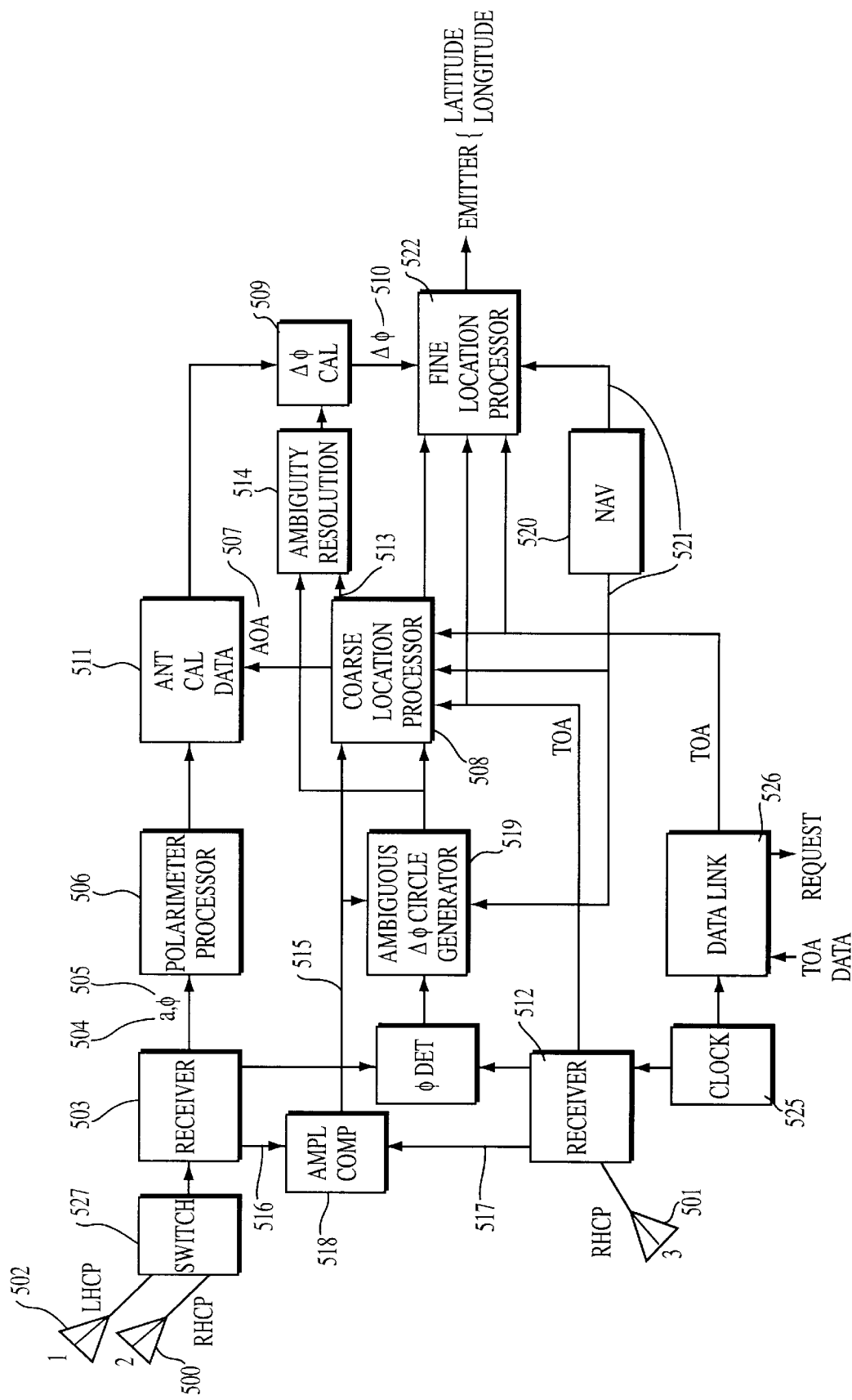
FIG. 5 is a block diagram of the preferred embodiment of the current invention.
Figure 6:
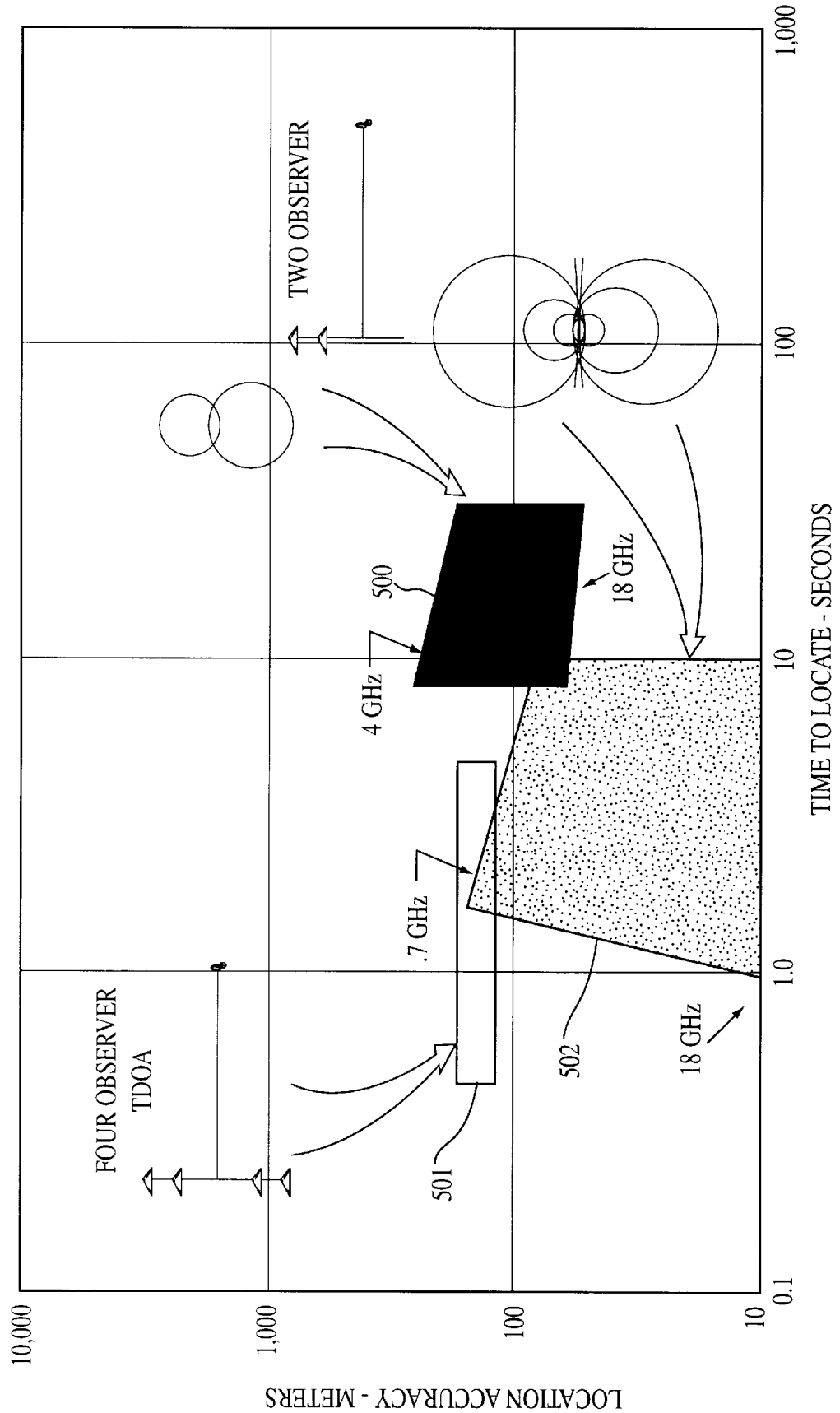
FIG. 6 shows performance for the current invention for the scenario in FIG. 2.

Referring to FIG. 5, which shows the measurement system located on each observing platform required to make both TDOA and LBI differential phase measurements. In making phase difference measurements with the LBI via antennas 500 and 501, the constant bias errors subtract out across dwells, as discussed above and further described by the applicant in U.S. Pat. No. 5,343,212. For instance, the antennas are shown squinted in FIG. 5, that is, with their boresites not parallel. Such squinted antennas are typical of RWR systems, and it is desirable to utilize the existing antenna installations for RWR systems when implementing this invention. This squint induces a phase measurement bias proportional to the emitter's elevation. But since elevation does not change significantly from dwell to dwell, this error cancels in making the differential measurements. The dominant dwell-to-dwell variable phase measurement error, which does not cancel, is caused by the change in emitter signal polarization when the receiver detects mainbeam, side and backlobes on different dwells. Reducing this error requires simultaneously measuring signal phase and amplitude by the collocated antennas 500, which is a right circularly polarized antenna and 502 which is a left circularly polarized antenna. Model 201600-2 dual circular polarization cavity back sinuous types made by Tecom Industries Inc. allow the simultaneous measurements of right hand circular polarization (RHCP) and left hand circular polarization (LHCP) outputs, and is typical of the type antennas that are used for this purpose. Switch 527 allows the RHCP antenna alone to be used with antenna 501 to form the LBI baseline. Switching from dual polarization to single polarization is done during each receiver dwell to allow polarization measurements to be made when LBI phase measurements are made. The amplitude 504 and phase 505 result from these dual polarization measurements, made by a receiver 503 assumed to have the performance of the Litton Industries' Amecom Division's LR-100 ESM Receiver. That is, the receiver has an amplitude measurement capability to 1.5 dB, and phase resolution accuracy to better than 3 electrical degrees. Emitter polarization is extracted from these phase and amplitude measurements in 506 using well established methods such as that described by Lee, Okubo and Ling in "Polarization Determination Using Two Arbitrarily Polarized Antennas," *IEEE Transactions on Antennas and Propagation*, vol. 36, no. 5. The emitter polarization, and signal AOA 507 obtained from the initial emitter location generated in the Coarse Location Processor 508, are used to determine the phase correction required from calibration data in 509. The adjusted phases 510 are then used to rederive the phase-circle LOP in the Fine Location Processor 522. The required calibration data stored in 509 is obtained using a full-scale mockup of the actual antenna installation, including radomes. The calibration data encompass the entire frequency band and azimuth-elevation field-of-view.

The high-resolution, but ambiguous, phase measurements made between antennas 500 and 501 by receivers 503 and 512 have the ambiguity differentially resolved by intercepting all ambiguous COP and the HLOP in processor 508 as previously described. In contrast to the approach in the applicant's copending patent application entitled, "Combined Phase-Circle and Multiplatform TDOA Precision Emitter Location," the phase ambiguity is resolved only after the emitter is initially located. This resolution is done in process 514, which uses location input 513 to predict the phase change at the LBI baseline for each measurement update. The technique for doing this was described in the applicant's U.S. Pat. No. 5,343,212 when input 513 consist of several possible emitter locations. For instance, in FIG. 3 the true emitter location 309 and incorrect intersection 312 may both be within system error bounds for candidate location positions. Ambiguity Resolution process 514 compares sequential phase measurement resolved by predicted phase for each location for consistency, and chooses the correct location out of the candidate set accordingly. In the FIG. 3 example, only COP-HLOP intersections in the neighborhood of the true location are indicated as possible multiple locations. The other ambiguous locations are deleted by amplitude comparison AOA 515 generated in 518 by measured signal amplitudes 516 and 517. The amplitude AOA can also aid in providing the basis for determining the set of possible ambiguity integers in process 519. Based on observer altitude and attitude 521 from the navigation system 520 the AOA is partitioned to provide means to predict phase and bound the ambiguity integer set. This integer set is then used to generate the candidate phase circles.

Multiplatform TDOA measurement methods are well established, and in this approach are accomplished as described in applicant's copending application entitled, "Combined Phase-Circle and Multiplatform TDOA Precision Emitter Location." Hence receiver 512 measures TOA with a resolution comparable to that of the Litton Industries Applied Technology Division's Advanced Digital Receiver, that is a resolution of 0.625 nsec. The clock 525 used in making the TOA measurement has the capability of the Westinghouse low-power, cesium cell, miniature atomic clock, that is a one-day stability of $10^{-11}$ second. This clock must be synchronized with a similar clock on the second platform using Data Link 526.

The TOA measurements made on the same pulse are differenced in 508, and, after same TOA pulse check, in 522. This same TOA pulse check consist of using the emitter location produced in 508 to predict pulse TOA windows at each observer, and then verifying the observed pulse was in the window.

The Fine Location Processor 522 combines the confirmed TDOA measurement generated HLOP and the calibrated and resolved phase 510 to produce a refined location estimate. In process 522 the location estimate is obtained using an adaptive optimal filter, which modifies the filter gain in a manner that decorrelates the estimator residual. This produces an accurate error variance estimate for fine location.

Figure 2:
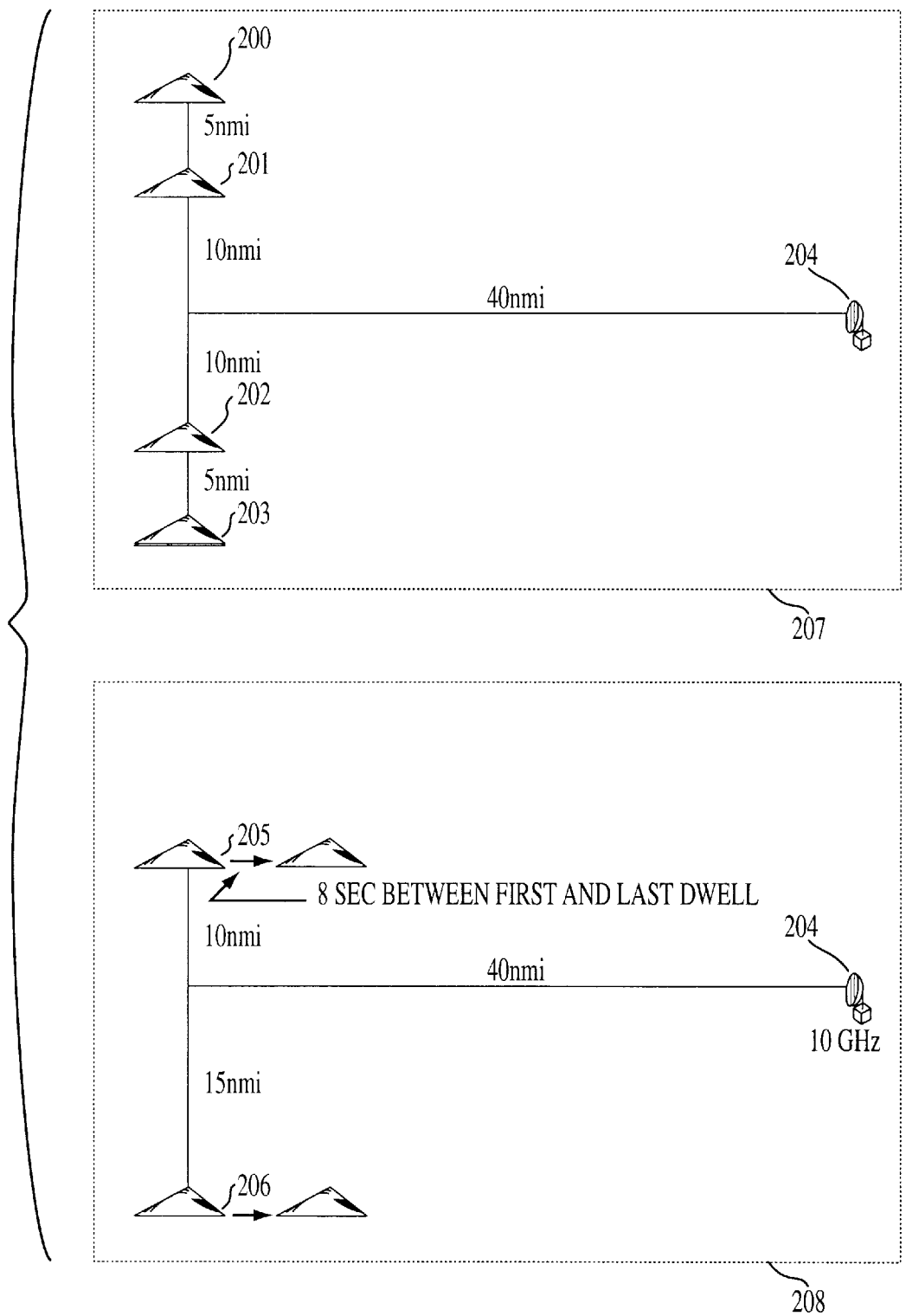
FIG. 2 shows the scenario used in generating performance given in FIG. 6 that contrasts the invention with TDOA-only and phase-circle-only methods.

In contrast to the method described in the applicant's copending application, "Combined Phase-Circle and Multiplatform TDOA Precision Emitter Location," this estimate does not partake the nature of TDOA-only, phase-circle only, or combined depending on the correctly scaled relative weights of the measurement error variances. It is always a phase-circle and TDOA combined estimate. Hence it is of interest to demonstrate the improved performance obtained over a phase-circle only or TDOA only approach for the same system errors. The TDOA errors include time-of-arrival (TOA) variation due to pulse rise time, video bandwidth and signal strength effects, signal propagation length differences, and receiver measurement variation; aircraft location errors due to GPS measurement variation; and time synchronization variation caused by phase error between the reference clock on each aircraft. The TOA system errors assumed produced a TOA error at each observer with a minimum one sigma statistical variation of 34.7 nsec and a maximum one sigma error of 62.1 nsec. This variation is due mostly to multiplatform clock phasing errors. The phase measurement errors include NAV attitude errors in locating the LBI baseline, antenna vibration induced errors, antenna phase mistrack bias, receiver calibration phase bias, and thermal noise and quantization errors. These errors produced a phase measurement error of 9° (used in coarse location) before polarization calibration and 3° after calibration (used in fine location). FIG. 5 contrast the performance for the two aircraft scenario used to produce the ambiguous COP and HLOP in FIG. 2 208 for both 500 phase-circle only and 502 combined methods with the four aircraft scenario shown in FIG. 2 207 required for 501 TDOA. The errors in the TDOA approach cannot be significantly reduced by averaging, and so do not decrease with time. The accuracy in the phase-circle only approach increases with the bearing difference subtended at the emitter, and hence does improve with time and also with increasing emitter frequency. The low frequency 0.7 GHz performance of the COP-HLOP method shown by 502 is comparable to the high frequency performance of the COP-only approach. This improvement is due to the GDOP reduction the addition of the TDOA LOP provides.

What is claimed is:

1. A method for determining the geolocation of a stationary emitter using at least a first and a second moving observer, the method comprising the steps of:

receiving first and second emitter signals, respectively, at the first and second moving observers;

measuring the ambiguous phase difference between the first and second signals at corresponding update intervals;

estimating the greatest and least possible integer value of the ambiguous phase difference, the integer values comprising a set of possible ambiguity integers;

performing pulse time-of-arrival (TOA) measurements of the emitter signal received by the observers over a predetermined clock interval;

using the TOA measurements performed by the observers to calculate the time-difference-of-arrival (TDOA) of corresponding, same-pulse, emitter signals;

generating a family of circular lines of position (LOPs) for each observer based on the ambiguous phase differences measured and the integer values estimated, wherein with no measurement error the emitter would lie on exactly one of the circular LOPs associated with each observer;

computing hyperbolic LOPs based on the TDOA calculations; and determining emitter location utilizing the intersection of the hyperbolic LOPs generated from the TDOA measurement, and circular LOP data.

2. The method of claim 1, said determining step comprising selecting the emitter location represented by the common intersection of the single circular LOPs, on which the emitter must lie in the absence of measurement error, from each family of circular LOPs associated with each observer, and a limb of the hyperbolic LOP on which, in the absence of measurement error, the emitter must lie.

3. The method of claim 1, said generating step comprising the step of bounding the set of possible ambiguity integers by making a preliminary estimate of coarse location of the emitter, and using only ambiguity integers that generate phase circles intersecting an error ellipse associated with the coarse location estimate.

4. The method of claim 3, further comprising the step of comparing the amplitudes of the signal direction of arrival measurements made on each of the at least two moving observers.

5. The method of claim 2, further comprising the steps of:

employing the determined emitter location to predict the direction of arrival (DOA) of the emitter signals associated with each ambiguous phase difference measurement;

refining the ambiguity integer estimates based on the DOA predictions; and differentially resolving each ambiguous phase difference measurement.

6. The method of claim 5, further comprising the steps of deriving emitter elevation from the direction of arrival predictions and utilizing the emitter elevation data to correct coning errors associated with said making step.

7. The method of claim 6, further comprising the step of adjusting the ambiguous phase difference measurements using the direction of arrival data and polarimeter measurements made at each ambiguous phase measurement to correct for phase difference measurement bias errors caused by changes in the emitter signal polarization.

8. The method of claim 7, wherein system measurement errors create a plurality of possible common intersections, said method further comprising the steps of:

applying a maximum likelihood estimator to process the adjusted ambiguous phase difference measurements to generate a corresponding set of refined estimated emitter locations; and choosing from the refined estimated emitter locations the unique one for which the difference between the phase and TDOA measurements predicted by the refined estimated location, and the actual adjusted respective phase and TDOA measurements associated with that location, form a sequence exhibiting the least statistical bias and the least sample-to-sample statistical correlation.

9. A system to geolocate a stationary emitter and comprising, as a minimum, two moving observers, both of whom measure the ambiguous phase change of the emitter between two positions on each of their flight paths, and two observers, possibly stationary or possibly the same observers performing the phase measurements, to measure emitter same-pulse time-of-arrival, comprising on each moving observer first and second antennas for generating first and second emitter detection signals containing ambiguous phase information, phase difference detection circuitry and memory to store the ambiguous phase thus detected between emitter updates, these updates typically being from one half to several seconds apart, means to difference these stored and ambiguous phase differences and means to estimate the largest and smallest possible integer value of the phase change ambiguity, a navigation system and association means providing the moving observer position at the start and end of the emitter update measurement, and the spatial location of the first and second antenna, and comprising on the possibly stationary observers, a clock on each observer having a one day stability of at least $10^{-11}$ second per day, means to adjust these clocks on two observers so that they are in temporal phase with one another, a data link to command the second observer to perform a pulse time-of-arrival (TOA) measurement during a predetermined clock interval, TOA measurement means on each observer, means to form the time-difference-of-arrival (TDOA) from these same-pulse TOA measurements, and including at a site possibly distinct from any observer, but data linked to the observers, computing means to derive initial emitter geolocation from the TDOA and phase-circle LOP estimates, including means to measure received signal amplitude on two or more antennas to determine the correct coarse location from a set of statistically equally likely estimates, means to measure the signal direction of arrival from the observer position at each phase measurement update and the initial emitter position estimate, means to predict the LBI phase from the estimated DOA and known LBI baseline position, means to employ this predicted phase to differentially resolve all the LBI ambiguous phase measurements between the first and final moving observer positions simultaneously for both observers, means to cone correct the measured resolved phase using the elevation found from the estimated DOA, a polarimeter to measure emitter polarization during the LBI phase measurement, calibration means to remove polarization induced phase errors from the resolved and cone corrected measured phase using a calibration table where the phase calibration data in the table is a function of DOA and emitter polarization, and is accessed using the computed DOA and measured polarization, computing means to rederive emitter geolocation from the TDOA and cone phase-circle LOP estimates generated from the corrected phase data, predictive means employing this refined location to verify the pulse TOA measured at each relevant observer is the same pulse from the same emitter, and corrective means to remeasure TDOA if it is not.

10. A system as in claim 9, where the emitter polarization is obtained from phase and amplitude measurements using a dual polarized antenna element, this antenna forming one element in the LBI array, comprising a receiver controlled switch at the dual antenna element to chose the same polarization as the second antenna element of the long baseline interferometer when making LBI phase measurements, and to allow during the same receiver dwell the simultaneously measurement of the dual antenna right and left polarization phase and amplitude response, with memory to stored these measurements, along with the observer position and attitude (NAV data) when the measurement was made, and means to subsequently generate emitter direction of arrival by combining the emitter coarse location with this stored NAV data, and so, based on the dual polarization phase and amplitude measurements, find the emitter polarization during the receiver dwell during which the LBI phase measurement was made.

11. A system as in claim 9 where generating the ambiguous set of phase-circles at each observer measuring LBI phase differences comprises bounding the LBI differential phase ambiguity integer set, utilizing observer altitude obtained from the NAV system at each of the LBI phase measurements, from which the maximum possible range to the emitter, or radar horizon, is found, the angular region relative to the LBI baseline in which the emitter can be detected when on the radar horizon, the angular region relative to the LBI baseline in which the emitter can be detected when at the closest assumed range from the observer, observer attitude and position obtained from the NAV system at each of the LBI phase measurements, means to determine the LBI antenna spatial locations from this position and attitude data at the phase measurement updates, and hence to determine the LBI baseline spatial position, means to determine, by postulating a uniform emitter distribution in the largest region determined from the radar horizon, minimum emitter range, and angular detection boundaries, and from the LBI baseline spatial position, the minimum and maximum ambiguity integer possible, association of a unique phase circle with each separate phase difference from the set of measured phase differences resolved by each integer between, and including, the maximum and minimum possible integer values.

12. A system as in claim 9 where the means to employ predicted phase obtained from the emitter location to differentially resolve all the LBI ambiguous phase measurements between the first and second moving observer positions simultaneously for both observers includes means to determine the correct emitter position estimate from a set of possible locations, where each estimate in this set of possible locations is initially determined to be statistically equally likely, before correcting the ambiguous phase measurements for bias errors caused by antennas being squinted, i.e. not having a common boresite, this system comprising generating a set of predicted LBI differential phase changes for each actual LBI differential phase measurement, using each possible emitter location, observer position and observer attitude during the LBI phase measurements, forming test sets of resolved LBI differential phase measurements, each test set formed by resolving all LBI differential phase measurements from the set of predicted phases associated with a possible emitter location, and forming all such sets for all equally likely location estimates, generating sets of azimuth estimates from the emitter and aircraft positions, and each phase test set, utilizing these sets of azimuth measurements to access a set of stored phase correction factors, which correction factors depend on signal DOA, and to apply these correction factors to the corresponding phase measurements to reduce the effects of polarization and elevation errors due to antenna squint, generating a new set of azimuth measurements from this set of corrected phase measurements, deriving the maximum likelihood estimate from the new azimuth estimates comprising a set associated with each possible emitter position, computing the variance of the emitter locations with the new azimuth estimates utilizing the well known theoretical properties of the maximum likelihood estimator, choosing the unique emitter location as the site associated with the statistically closest match between azimuth measurement errors predicted from this variance, and the azimuth errors actual measured.

* * * * *